Feb. 13, 1973  L. SCHUSSLER  3,715,908
FORGING MANIPULATORS
Filed May 21, 1971

INVENTOR.
LUDWIG SCHUSSLER
BY Holman, Glascock,
Downing & Seebold
ATTORNEYS

United States Patent Office 3,715,908
Patented Feb. 13, 1973

3,715,908
FORGING MANIPULATORS
Ludwig Schussler, Willich, Germany, assignor to Schloeman Aktiengesellschaft, Dusseldorf, Germany
Filed May 21, 1970, Ser. No. 39,219
Claims priority, application Germany, May 24, 1969,
P 19 26 638.7
Int. Cl. B21j 13/10; B23q 3/00
U.S. Cl. 72—420                     3 Claims

ABSTRACT OF THE DISCLOSURE

In a forging manipulator, apparatus is provided for controlling the position of workpiece holding jaws with respect to the body of the forging manipulator. The jaws are mounted on the body by a suspension system including a pressure fluid operated cylinder and piston unit, a first accummulator in fluid connection with the cylinder, a second accummulator for higher pressure fluid connected through a pressure regulating valve to the first accummulator, and sensing means, such as a potentiometer, for providing a control signal in accordance with the relative positions of the cylinder and piston to control the pressure regulating valve to admit fluid as necessary into the first accummulator so as to bias the suspension system to a predetermined position.

---

The invention concerns improvements in and relating to forging manipulators and in particular apparatus for controlling the position of jaws of a forging manipulator and for controlling displacement from its normal position. The jaws or gripper support member are mounted on the body of a forging manipulator by a suspension system which is controllable in accordance with a load carried in the jaws.

The jaws or gripper support of a forging manipulator, which act to hold a workpiece for forging, are arranged to insert the workpiece between lower and upper saddles of a forging press. The lower and upper saddles act as an anvil and hammer respectively. It is necessary that a certain distance be provided between the upper edge of the lower saddle and the lower edge of the workpiece, i.e. such that the workpiece or ingot is not able to slide on the lower saddle, since such sliding would result in both wear on the lower saddle and a heat loss from the workpiece.

In addition, the workpiece should be positioned in a resiliently displaceable manner above the lower saddle, and in such a way that it is pressed against the lower saddle by only a small force applied as the upper saddle moves downward in a no-load stroke to take up clearance before a forging stroke. If the counter-force of the resilient mounting means of the workpiece is too great, there is a risk of the workpiece under going permanent deformation, known as "sabre deformation." Hitherto these resilient mounting means or suspension systems have generally been composed of compression or tension springs. For example, helical springs have been provided in the front and rear jaw suspension units in a forging manpulator truck.

In another device the jaws are suspended by an endless chain from a transverse beam which abuts, through very long helical springs which are not pretensioned, on the manipulator. Fundamentally, long helical springs are desirable if a soft spring characteristic is to be obtained.

These previous devices have, however, the disadvantage that the springs are generally designed for the weight of the largest workpiece which can be handled by the jaws and for the maximum load. This means that when workpieces are light the suspension action is too strong, so that there is a risk of the workpiece being bent when it is pressed down onto the lower saddle.

According to the present invention, there is provided apparatus for controlling the position to which jaws of a forging manipulator are biased, the apparatus comprising means for mounting the jaws on the forging manipuator, the mounting means including a pressure fluid operated cylinder and piston unit, a first accummulator arranged to be connected to the cylinder to supply pressure fluid, a second accummulator for pressure fluid at a higher pressure than that in the first accummulator and arranged to supply pressure fluid thereto, a pressure regulating valve arranged to control the pressure fluid supply from the second accummulator to the first accummulator, and sensing means for sensing the relative positions of the piston and cylinder and for providing a signal corresponding to the relative position to control the pressure regulating valve, such that the means for mounting the jaws are biassed to a position which is controlled by the fluid pressure in the cylinder.

In previous devices the jaw suspension system cannot be directly adjusted to the weight of the workpiece in each case, whilst according to the present invention the jaw suspension system can be steplessly adjusted to the particular weight of a workpiece and its position in the jaws. The suspension system can be automatically adjusted to variations in load on the jaws due to the jaws being pivotally mounted and the workpiece increasing in length away from the pivoted mounting during forging.

The sensing means can be electrically operated and is preferably a potentiometer, which has its members arranged in the piston rod and on the cylinder and is electrically connected preferably through a bridge switching device to the electrically controlled pressure regulating valve which regulates the pressure in the cylinder and first accummulator. In an embodiment of the invention the potentiometer comprises a coil which is secured to the piston rod and a sliding contact which is secured to the cylinder and slides on the coil. Due to the arrangement of a potentiometer between the piston rod and the cylinder of the hydraulic suspension system, vertical deflections of the jaws, i.e. relative movements of the cylinder and piston rod, are sensed electrically. This means that it is possible, using an electrically controlled pressure regulating valve, to increase the pressure in the cylinder below the piston and in the first pressure accummulator such that when the jaws and potentiometer move resiliently back, the potentiometer does not return to its initial position.

In order to avoid the bridge switching device acting when the piston and piston rod and hence the jaws move downwards with the workpiece, according to another embodiment of the invention, the resistance of the potentiometer may be switched on and off steplessly by means of an electrical device connected therewith which serves to adjust the height of the stroke of a forging press which cooperates with the forging manipulator and which is connected to the said resistance, to predetermined paths which correspond to the vertical deflection of the jaws.

Since the stroke of the forging press and hence, when the thickness of the workpiece is known, the vertical drop of the workpiece are predetermined for each stroke, the deflection of the potentiometer and the variation in resistance associated therewith for this known length of vertical deflection of the jaws may be switched off. This prevents pressure in the cylinder being increased through the pressure regulating valve when the workpiece moves downwards with the jaws. When (at the termination of the stroke) the jaws reach the lower reversal point, which is predetermined by means of the potentiometer and setting device, the whole resistance variation of the potentiometer is again switched on. This in turn actuates the pressure regulating valve through the bridge switching device. This means that the pressure in the cylinder may be increased until the workpiece reaches its initial position mid-way between the open saddles, i.e. until the potentiometer has again reached its zero or initial position.

If, however, the response time, i.e. the time which elapses between the electrical contact and the opening of the pressure regulating valve, is greater than the time taken for the hydraulic suspension unit to return to the top dead centre position, the pressure regulating valve does not open. This automatic regulation of the pressure in the cylinder of the hydraulic spring arrangement is of particular advantage when as a result of the increase in length of the workpiece during forging, the load moment on the jaws increases. This regulation according to the invention ensures that the jaws and workpiece always return to initial position. This makes it possible for the return force when the workpiece is urged downwards on to the lower saddle of the forging press to be of only such a value that equilibrium with the weight of the workpiece and the jaws is maintained.

The invention will be further described, by way of example, with reference to the accompanying drawings, of which:

Figure 1:
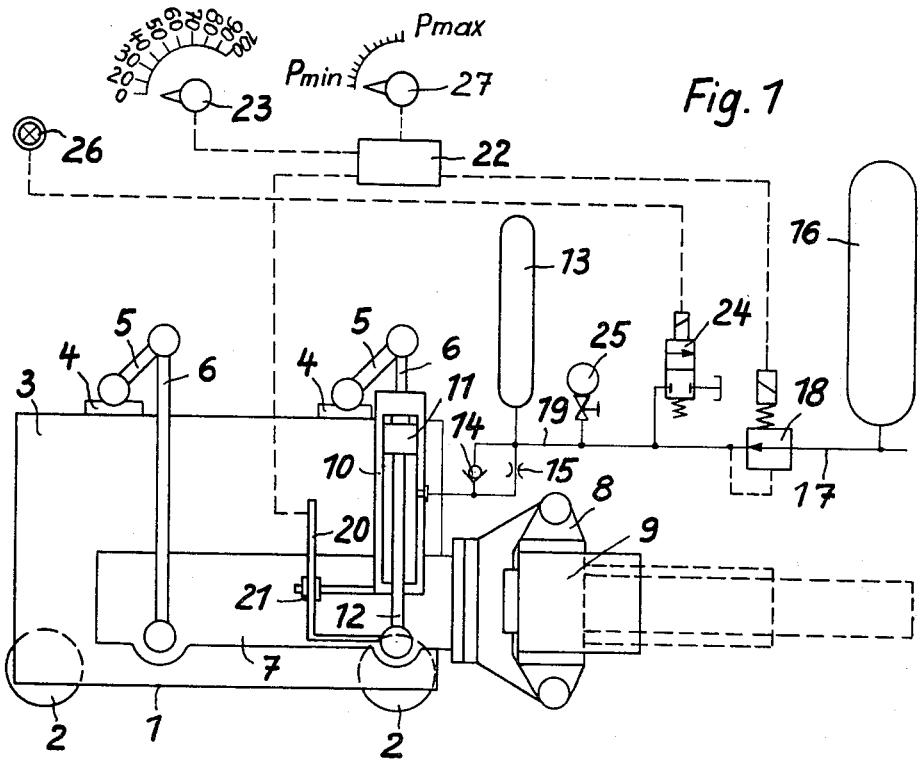
FIG. 1 shows diagrammatically a forging manipulator having jaws and a suspension system according to the invention.

A forging manipulator comprises a manipulator truck 1 running on wheels 2 and having cross-pieces 4 mounted on its side walls 3. Angle levers 5 are pivotably mounted on the cross-piece 4, and drawbars 6 are articulated to the angle levers 5, a jaw mounting member 7 being pivotably mounted on the drawbars 6. Jaws 8 and work-piece 9 are mounted on the jaw mounting member 7.

The drawbar 6 shown on the left in FIG. 1 forms a fixed suspension member, whereas the right-hand or front drawbar 6 is mounted on a hydraulic resiliently displaceable suspension system. The suspension system comprises a cylinder 10, piston 11 and piston rod 12, the cylinder 10 being secured to the front drawbar 6 while the piston rod 12 is articulated to the jaw mounting member 7. A first hydraulic accumulator 13 is connected to the cylinder 10 through a non-return valve 14 and a choke valve 15, the two valves being connected in parallel. A hydraulic pump (not shown) fills a second pressure accumulator 16 with pressurized fluid, for supplying high pressure hydraulic fluid through a line 17, to an electrically controlled pressure regulating valve 18 to a line 19 into the first accumulator 13, which acts as a spring accumulator, and into the cylinder 10.

A potentiometer comprises an elongated coiled winding on former 20 connected to the piston rod 12 and a sliding contact 21 connected to the cylinder 10. An electrical connection leads to a bridge connecting and switching device 22, such as a Wheatstone Bridge, which is connected both to the pressure regulating valve 18 and to an impedance setting and adjusting device 23. The setting and adjusting device 23 is set in accordance with the necessary stroke of a forging press (more particularly the necessary distance between upper and lower reversal points of the upper saddle 29) which co-operates with the manipulator.

An electrically actuated outlet valve 24 and a manometer 25 are connected to the line 19. The outlet valve 24 is actuated by a switch 26. A hand-operated spring adjuster 27 may be adjusted between a minimum pressure $P_{min}$ and a maximum $P_{max}$.

The setting to $P_{min}$ corresponds to the pressure required in order to hold the jaw mounting means 7, without a workpiece 9, just in equilibrium in a top dead centre position of the piston 11. The $P_{max}$ setting represents the maximum pressure in the accumulator 16. The pressure regulating valve 18 covers a range of between 30 and 100% of the maximum pressure in the accumulator 16. The $P_{min}$ pressure represents 50% of $P_{max}$. Once set to arrange the initial position of the jaw mounting means where desired, normally no further adjustment is made to the hand operated spring adjuster 27.

The figures on the setting device 23 refer to the stroke of the forging press which corresponds as follows:

Stroke mm.:
20  30  40  50  60  70  80  90  100
Reduction in the thickness of workpiece, mm.:
10  15  20  25  30  35  40  45  50

The stroke of the forging press (which is usually double the desired reduction according to normal practice in the art) is the distance between the top and bottom dead centre position of the upper saddle 29 the reduction in thickness of the workpiece is the distance by which, between them, the upper and lower saddles 29, 28 penetrate into the workpiece 9.

Figure 2:
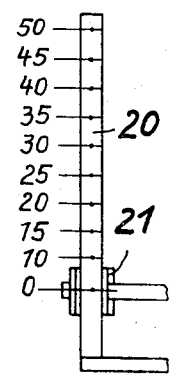
FIG. 2 shows a potentiometer on an enlarged scale.

The potentiometer (FIG. 2) is scaled from 1 to 50. This measurement is the difference between the length of the stroke and the depth of penetration.

The operation of the suspension system is as follows:

The stroke setting device 23 is set to zero and the spring pressure 27 to $P_{min}$. The hydraulic pump, which is not shown, fills the pressure accumulator 16 with the pressurised hydraulic fluid. At the same time the pressurised medium flows through the line 17, pressure regulating valve 18, line 19 into the pressure accumulator 13 and cylinder 10. As pressure rises, the piston rod 12 moves in the cylinder 10, the jaws being raised without the workpiece 9. The arrangement is such that the piston 11 arrives just at the top of the cylinder 10 when the pressure in the cylinder 10 and pressure accumulator 13 is about 50% of the maximum pressure of the reservoir 16. The pressure regulating valve 18 now closes and the pump fills the pressure accumulator 16 until it attains maximum pressure $P_{max}$. Subsequently the potentiometer (20, 21) is set to zero.

The automatic adjustment of the suspension system according to the weight of the workpiece is as follows:

The jaw mounting member 7 with jaws 8, which are in equilibrium when the piston 11 is in the top dead centre position in the cylinder 10, grips a workpiece 9 which is to be forged. Since the pressure hitherto set, viz $P_{min}$ is no longer sufficient to hold the jaw mounting member 7 in the top dead centre position, the hydraulic fluid is urged out of the cylinder 10 and into the pressure accumulator 13. At the same time the piston rod 12 moves partially out of the cylinder 10. The coil 20 secured to the piston rod 12 is thus moved from its zero or null position. This deflection of the potentiometer produces an electrical voltage in the bridge switching device 22 which again causes the pressure regulating valve 18 to open. This causes more of the pressurised hydraulic fluid to flow out of the pressure accumulator 16 and into the pressure accumulator 13 and cylinder 10, until the piston 11 reaches the top of the cylinder 10 and the potentiometer 20, 21 again reaches its zero or null position.

Since the variation in resistance is now compensated in the bridge switching device 22, a control signal in the form of a voltage applied to the pressure regulating valve 18 no longer occurs so that the valve closes. The elastic supporting force in the hydraulic suspension unit is thus increased and is automatically adjusted to the additional weight of the workpiece 9, for example by operation of limit switches associated with the winding of the potentiometer.

Figures 3A, 3B, 3C:
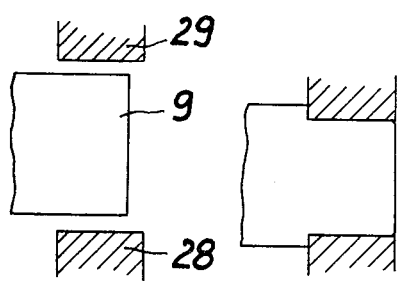
FIGS. 3a to 3c show the various positions of a workpiece during forging between upper and lower saddles of a forging press, the forging press not being shown in FIGS. 1 and 2.

The automatic adjustment of the hydraulic suspension unit to variations in load moment during forging takes place as follows:

As the forging process commences, the workpiece is held in the jaws 8 and advanced to a position between the lower saddle 28 of a forging press and the upper saddle 29 by movement of the manipulator truck. The positions attained is as shown in FIG. 3a. The upper saddle 29 is moved downwards to determine the thickness of the workpiece 9, for example 250 mm. Assuming that the thickness of the workpiece is to be reduced by 50 mm. during the forging (and hence a 100 mm. stroke of the forging press), the upper saddle 29 is raised so that a distance of 300 mm. exists between the lower saddle 28 and upper saddle 29 the 250 mm. workpiece being symmetrically placed within the 300 mm. distance (FIG. 3a). The setting device 23, for setting the length of stroke, is set to 100. This causes the potentiometer (20, 21) to be automatically effectively reset so that its null position is 50 instead of zero on its scale, i.e. no control signal is passed to operate the pressure regulating valve 18 until the coil 20 has been displaced beyond the 50 position. In other words, the null position occurs with the workpiece midway between the saddles when 300 mm. apart.

At the beginning of the forging process, the upper saddle 29 effects a no-load stroke of 50 mm. (25 mm. until it abuts the workpiece, plus 25 mm. against the hydraulic suspension unit until the workpiece abuts the lower saddle 28) the workpiece abuts both saddles, the upper saddle 29 then proceeding with the forging stroke of 50 mm. to penetrate the workpiece (FIG. 3b). The hydraulic suspension unit is meanwhile constrained to effect a stroke of 50 mm. (25 mm. as aforesaid until the workpiece abuts the lower saddle, plus 25 mm. as the thickness of the workpiece is symmetrically reduced by said 50 mm. forging stroke). Since the potentiometer 20, 21 only moves into ready position with this stroke, there is still no variation in resistance and hence no electrical voltage is produced for opening the valve 18. When the upper saddle 29 reaches its bottom dead centre position and the potentiometer (20, 21) reaches the position 50, the ready position of the potentiometer 20, 21 is transformed into a working position by means of an electrical contact, i.e. the 50 mm. travel of the variation in resistance on the coil 20 affects the bridge switching member device 22. The pressure regulating valve 18 is caused to open by the voltage thus produced.

If however, the time between the electrical contact being made and opening of the pressure regulating valve 18 is greater than the return time of the hydraulic suspension unit to its top dead centre position on the head of the cylinder 10, the pressure regulating valve 18 does not open. The return time may be influenced or adjusted by means of the valve 15.

When the workpiece 9 is to be further forged (FIG. 3c) there occurs a variation in load moment on the manipulator 1 since as the workpiece 9 becomes longer, the common centre of gravity of the jaw mounting member 7 and workpiece 9 moves towards the right (as shown in dotted lines in FIG. 1). The hydraulic elastic force hitherto available is not sufficient to bring the jaw support member 7 with the workpiece 9 back to its initial position. There is therefore a certain deflection of the potentiometer 20, 21 so that variations in resistance occur; this causes the pressure regulating valve 18 to open by means of the voltage now present. Hence pressurised fluid flows from the accumulator 16 into the accumulator 13 and cylinder 10 until the piston 11 reaches its top dead centre position and the potentiometer moves back into zero or null position.

In the zero position of the potentiometer 20, 21, an electrical contact is established which switches the set zero position from a working position into a ready position, i.e. the bridge switching device 22 does not respond to produce a control signal until the potentiometer reaches the point 50. As the load moment continues to vary as the workpiece 9 continues to increase in length, the process described is repeated.

When the workpiece 9 has been forged and removed from the jaws 8, the setting device 23 for the stroke length is set to zero and by actuating the switch 26, the valve 24 is switched electrically to "drain." This enables the hydraulic spring to relax until the manometer 25 shows that the $P_{min}$ pressure has been reached.

I claim:
1. Apparatus for holding a workpiece to be forged, comprising jaws for engaging the workpiece, means for mounting the jaws on a forging manipulator, the mounting means including a pressure fluid operated cylinder and piston suspension unit, a first reservoir in fluid connection with the cylinder, a second reservoir for supplying fluid at a higher pressure than that in the first reservoir to the first reservoir, a pressure regulating valve arranged to control the pressure fluid supply from the second reservoir to the first reservoir, means for sensing the relative position of the piston and cylinder, means for providing a control signal in accordance with the sensed relative position of the piston and cylinder, a presettable device and means for comparing the control signal with the setting of the presettable device to provide an output signal to control the pressure regulating valve, whereby the means for mounting the jaws are biased to a predetermined position with respect to the forging manipulator.

2. Apparatus as claimed in claim 1, wherein the comparing means includes means for providing a control signal to maintain the pressure regulating valve in a closed position when the comparing means receives a signal from the sensing means corresponding to predetermined relative positions of the piston and cylinder.

3. Apparatus as claimed in claim 1, wherein the comparing means is a bridge switching device.

References Cited
UNITED STATES PATENTS

| | | | |
|---|---|---|---|
| 3,126,770 | 3/1964 | Wupperman et al. | 72—420 X |
| 3,370,452 | 2/1968 | Sack et al. | 72—420 |
| 3,427,853 | 2/1969 | Thomas | 72—420 |
| 2,720,800 | 10/1955 | Taylor | 72—420 |
| 3,122,992 | 3/1964 | Kautz | 60—51 X |
| 3,385,169 | 5/1968 | Hale et al. | 91—390 |

ANDREW R. JUHASZ, Primary Examiner

H. M. CULVER, Assistant Examiner

U.S. Cl. X.R.

269—24, 56